United States Patent [19]

Masaki

[11] 4,280,471
[45] Jul. 28, 1981

[54] CONTROL SYSTEM FOR INTERNAL COMBUSTION ENGINE

[75] Inventor: Kenji Masaki, Yokohama, Japan

[73] Assignee: Nissan Motor Company, Limited, Yokohama, Japan

[21] Appl. No.: 109,482

[22] Filed: Jan. 4, 1980

[30] Foreign Application Priority Data

Jan. 22, 1979 [JP] Japan .................................. 54-6414

[51] Int. Cl.³ .......................................... F02M 25/06
[52] U.S. Cl. ..................................... 123/571; 123/585
[58] Field of Search ............... 123/571, 585, 588, 589, 123/587, 586, 568

[56] References Cited

U.S. PATENT DOCUMENTS

| | | | |
|---|---|---|---|
| 2,787,989 | 4/1957 | McKinley | 123/571 |
| 2,889,904 | 6/1959 | Martinoli | 123/571 |
| 3,782,348 | 1/1974 | Linder | 123/571 |
| 3,788,284 | 1/1974 | Gardner | 123/571 |
| 3,969,614 | 7/1976 | Moyer et al. | 123/571 |
| 3,981,284 | 9/1976 | Gospodar | 123/571 |
| 4,064,851 | 12/1977 | Wessel | 123/571 |
| 4,146,000 | 3/1979 | Hattori et al. | 123/589 |
| 4,163,282 | 7/1979 | Yamada et al. | 123/571 |

FOREIGN PATENT DOCUMENTS

| | | |
|---|---|---|
| 2619874 | of 1976 | Fed. Rep. of Germany . |
| 2805122 | of 1978 | Fed. Rep. of Germany . |
| 393443 | 6/1933 | United Kingdom . |
| 1368472 | 9/1974 | United Kingdom . |
| 1464914 | 2/1977 | United Kingdom . |
| 1542171 | 3/1979 | United Kingdom . |
| 2006988 | 5/1979 | United Kingdom . |

*Primary Examiner*—Wendell E. Burns
*Attorney, Agent, or Firm*—Schwartz, Jeffery, Schwaab, Mack, Blumenthal & Koch

[57] ABSTRACT

In an internal combustion engine having an exhaust gas recirculation system and an intake air bypass system, a control system is provided which comprises an electric motor arranged to control the flow rate of exhaust gases through the exhaust gas recirculation system under part-throttle or full-throttle conditions of the engine and the flow rate of air through the intake air bypass system under idling conditions of the engine.

10 Claims, 2 Drawing Figures

FIG. I

CONTROL SYSTEM FOR INTERNAL COMBUSTION ENGINE

FIELD OF THE INVENTION

The present invention relates in general to internal combustion engines for automotive use and, particularly, to a control system for controlling the recirculation of exhaust gases from the exhaust system to the mixture supply system of the engine and the delivery of additional air into the mixture supply system under predetermined operating conditions of the engine.

BACKGROUND OF THE INVENTION

An internal combustion engine for automotive use is known which is equipped with an exhaust gas recirculation system for recirculating exhaust gases from the exhaust system to the air-fuel mixture supply system of the engine at controlled rates. Recirculation of exhaust gases to the mixture supply system is conductive to the reduction of the concentration of noxious nitrogen oxides in the exhaust gases to be discharged from the engine and is, for this reason, effected primarily when the engine is operating under part-throttle or full-throttle conditions.

With a view to assuring stable combustion of combustible charges under idling conditions while achieving reduction of nitrogen oxides in exhaust gases under part-throttle and full-throttle conditions, an internal combustion engine thus equipped with an exhaust gas recirculation system is usually further provided with an intake air bypass system adapted to supply additional air to the engine through a passageway which bypasses the throttle valve in the mixture supply system of the engine during idling conditions when the throttle valve is held in an idling or minimum-open angular position thereof.

In a prior-art internal combustion engine of this type, the exhaust gas recirculation system and the intake air bypass system thus operative are arranged and controlled independently of each other. This has resulted in added complications of the engine construction and has enhanced the severity of the space requirement of the engine.

As alluded to above, however, the intake air bypass system is required to operate under idling conditions alone of the engine while the exhaust gas recirculation system is required to be operative only during part-throttle and full-throttle conditions of the engine. During idling conditions, practically negligible amounts of nitrogen oxides are produced in the combustion chambers of the engine and, therefore, there is no need of recirculating exhaust gases to the mixture supply system. Under part-throttle or full throttle conditions of the engine, the throttle valve in the mixture supply system is held in a wide open or fully open position so that the air to be admixed to fuel in the mixture supply system need not be supplied to the engine through the intake air bypass passageway. Thus, one of the exhaust gas recirculation system and the intake air bypass system is permitted to remain inoperative when the other of the systems remains operative and vice versa.

Attempts have therefore been made to provide an internal combustion engine in which the exhaust gas recirculation system and the intake air bypass system share some operational parts therebetween. Because, however, of the fact that the exhaust recirculation and intake air bypass systems of a conventional internal combustion engine ordinarily uses a vacuum-operated control valve and a solenoid-operated valve controlled by pulse signals, such attempts could not be successfully realized.

The present invention contemplates provision of an internal combustion engine featuring a control system adapted to effectively combine an exhaust gas recirculation system and an intake air bypass system so that both of the systems not only have some operational parts in common but are controlled by one and the same control system.

SUMMARY OF THE INVENTION

In accordance with the present invention, there is provided in an internal combustion engine including an air-fuel mixture supply system having a throttle valve incorporated therein, an exhaust system, an exhaust gas recirculation passageway for recirculating exhaust gases from the exhaust system to the mixture supply system at controlled rates, and an intake air bypass passageway for allowing air to be admitted at controlled rates into the mixture supply system downstream of the throttle valve when the throttle valve is in a minimum-open angular position thereof, a control system comprising, in combination, valve means operative to control the flow rate of the exhaust gases to be recirculated through the exhaust gas recirculation passageway and the flow rate of air to be passed through the intake air bypass passageway, an electric motor operatively connected to the valve means for actuating the valve means in response to electric signals supplied to the motor, and a control circuit responsive to variable parameters related to prescribed operational conditions of the engine for operating the motor on the basis of the parameters. The valve means may comprise an exhaust gas recirculation rate control valve including a valve element responsive to suction in the mixture supply system downstream of the throttle valve and movable in opposite first and second directions respectively to interrupt and allow passage of exhaust gases through the exhaust gas recirculation passageway, and an air flow control valve including a valve element movable across a position allowing the intake air bypass passageway to be open into the mixture supply system downstream of the throttle valve, the electric motor being mechanically coupled to the respective valve elements of the recirculation rate control valve and the air flow control valve. In this instance, the control system may further comprise linkage means operatively intervening between the respective valve elements of the exhaust gas recirculation valve and the air flow control valve, the electric motor being mechanically coupled to the linkage means for driving the valve elements to move independently of each other under some predetermined conditions of the engine and together with each other under other predetermined conditions of the engine. If desired, the valve means may comprise a three-way shift valve having two inlet ports respectively open to the exhaust gas recirculation passageway and the intake air bypass passageway and an outlet port communicable with either of said inlet ports depending upon a signal supplied from the control circuit, and a flow control valve having an inlet port communicating with the outlet port of the shift valve and an outlet port communicating with the mixture supply system downstream of the throttle valve, the flow control valve having a valve element positioned between the inlet and outlet ports of the flow control valve and operatively connected to the output shaft of the electric motor for being operated between minimum-open and maximum-open positions depending upon signals supplied from said control circuit.

BRIEF DESCRIPTION OF THE DRAWINGS

The features and advantages of the control system proposed by the present invention will be more clearly appreciated from the following description taken in conjunction with the accompanying drawings, in which.

DESCRIPTION OF THE PREFERRED EMBODIMENTS

Figure 1:
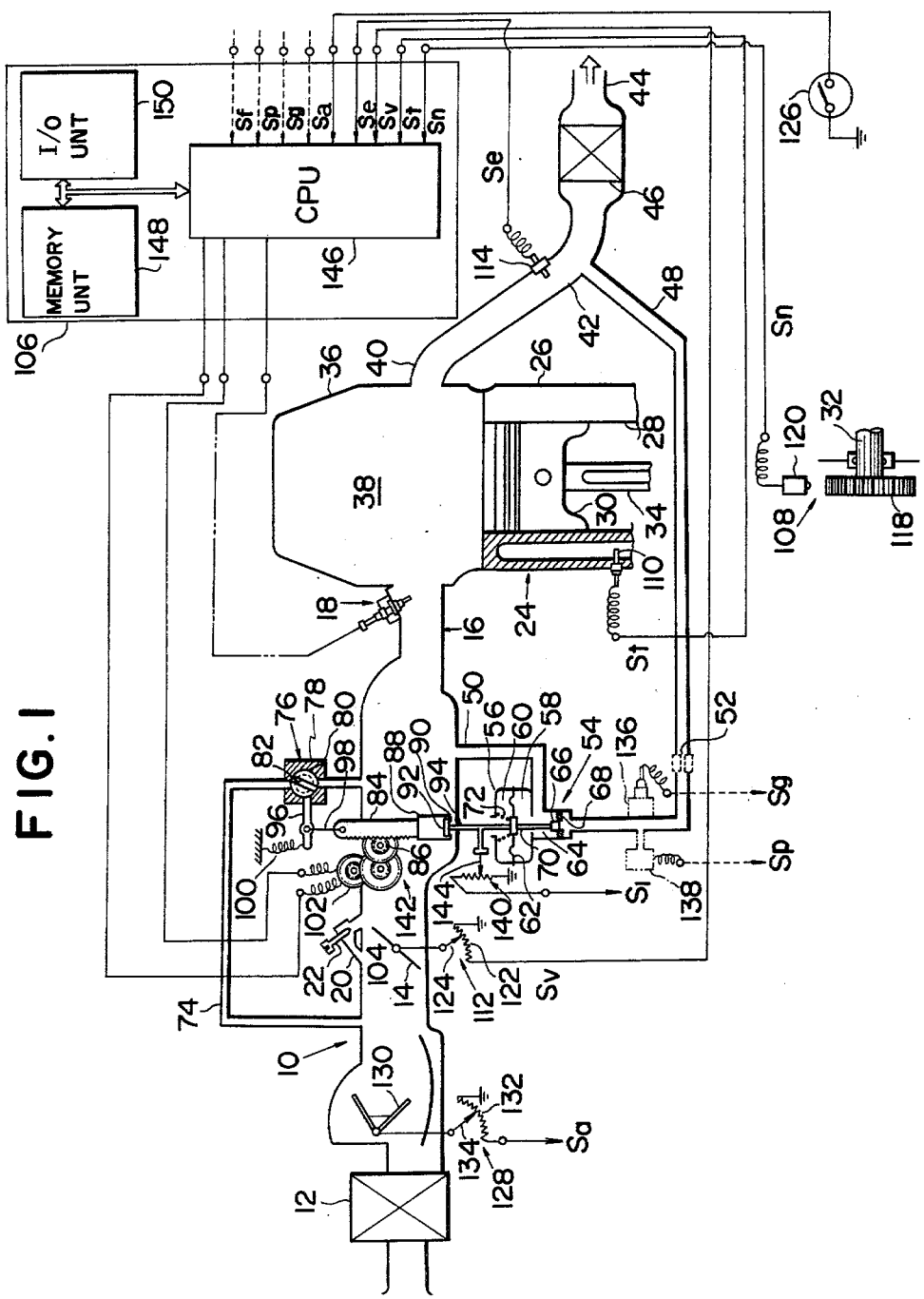
FIG. 1 is a view showing partially in section and in per schematically a preferred embodiment of the control system according to the present invention.

Referring to the drawings, first particularly to FIG. 1, thereof, an internal combustion engine incorporating an embodiment of the control system according to the present invention is assumed to be of the fuel injection type by way of example and is, thus, shown comprising an air-intake and air-meter assembly 10 including an air cleaner 12 open to the atmosphere and a throttle valve 14 positioned downstream of the air cleaner 12. As is well known in the art, the throttle valve 14 is mechanically linked to the accelerator pedal (not shown) of an automotive vehicle and is operative to control the flow rate of air through the air-intake and air-meter assembly 12 depending upon the degree to which the accelerator pedal is depressed. The air-intake and air-meter assembly 10 is connected to an intake manifold 16 having provided therein electrically operated fuel injection valves 18 each adapted to inject fuel into each of the intake ports or directly into each of the power cylinders of the engine. The air-intake and air-meter assembly 10 including the throttle valve 14 and the intake manifold 16 including the fuel injection valves 18 constitute, in combination, a mixture supply system for the engine. If desired, the fuel injection valves 18 which are assumed to be provided respectively for the individual power cylinders may be substituted by a single fuel injection valve common to the power cylinders or two or more fuel injection valves each common to each of the groups of the power cylinders.

In the mixture supply system of the engine illustrated in FIG. 1, the air-intake and air-meter assembly 10 is shown to be further provided with an adjustable idling air passageway 20 which is arranged in such a manner as to bypass the throttle valve 14 when the throttle valve 14 is in an idling or minimum-open angular position thereof. An adjustment bolt 2 projects into the passageway 20 so that the flow rate of air through the passageway 20 can be manually adjusted as desired.

The individual power cylinders of the engine are herein represented by a power cylinder 24 having a cylinder block 26 formed with a cylinder bore 28. A reciprocating piston 30 is axially movable back and forth in the cylinder bore 28 and is coupled to an engine crankshaft 32 (shown at the bottom of FIG. 1) by a connecting rod 34. The cylinder block 26 is topped by a cylinder head 36 which defined in the cylinder 24 a variable-volume combustion chamber 38 between the cylinder jead 36 and the upper face of the reciprocating piston 30. Though not shown in the drawings, the power cylinder 24 comprises an intake valve which is movable into and out of the combustion chamber 38 for providing communication between the intake manifold 16 and the combustion chamber during each cycle of operation of the engine as is well known in the art.

The power cylinder 24 further comprises an exhaust valve (not shown) across which the combustion chamber 38 of the cylinder 24 is communicable with a exhaust system during each cycle of operation of the engine, as is also well known in the art. The exhaust system comprises an exhaust manifold 40 leading from the respective combustion chambers 38 of the individual power cylinders 24 past the exhaust valves in the cylinders, an exhaust pipe 42 leading from the exhaust manifold 40, and a tail pipe 44 leading from the exhaust pipe 42 and open to the atmosphere at its leading end. In the arrangement illustrated in FIG. 1, the exhaust system of the engine is assumed to further comprise a catalytic converter 46 provided in the exhaust pipe 42 for exhaust emission control purposes. The mixture supply system and the exhaust system of the internal combustion engine thus constructed and arranged being well known in the art, description regarding further details of the construction and operation of the systems per se will not be herein incorporated to avoid prolixity of description.

In the internal combustion engine into which the improvement according to the present invention is to be incorporated, there is further provided an exhaust gas recirculation system comprising an exhaust gas recirculation passageway 48 leading from, for example, from the exhaust pipe 42 as shown and an exhaust gas feed passageway 50 terminating in, for example, the air-intake and air-meter assembly 20 downstream of the throttle valve 14 as shown. The exhaust gas recirculation passageway 48 is provided with a flow restriction or orifice 52 for restricting the flow of the exhaust gases to be passed through the passageway 48 to the exhaust gas feed passageway 50.

Between the exhaust gas recirculation and feed passageways 48 and 50 thus arranged is provided a vacuum-responsive exhaust gas recirculation rate control valve 54 adapted to control the recirculation rate of exhaust gases to the mixture supply system of the engine the recirculation rate control valve 54 comprises a valve casing 56 which is internally divided into two variable-volume chambers consisting of an exhaust gas chamber 58 and an air chamber 6 by a flexible diaphragm 62 secured along is perimeter to the valve casing 56 and hermetically sealing the chambers 58 and 60 from each other. The exhaust gas chamber 58 is in constant communication with the exhaust gas feed passageway 50 through an opening formed in the casing 56 while the air chamber 60 is constantly open to the atmosphere through a breather port formed in the casing 56.

The valve casing 56 of the recirculation rate control valve 54 is further formed with a valve chamber 64 which is constantly open to the exhaust gas feed passageway 50 and the exhaust gas chamber 58 in the valve casing 56. The valve chamber 64 is communicable with the exhaust gas recirculation passageway 48 across a generally frusto-conical valve element 66 which is axially movable into and out of a position closing the aperture in an annular valve seat element 68 fixedly positioned between the valve chamber 64 and the exhaust gas recirculation passageway 48. The valve element 66 is secured to or integral with an elongated valve stem 70 at one end of the valve stem. The valve stem 70 in turn is secured at the other end therof to the diaphragm 62 through the valve and exhaust gas chambers 64 and 58 as shown. The valve stem 70 is axially movable with the diaphragm 62 with respect to the valve casing 56 so that the valve element 66 carried by the valve stem 70 is axially movable into and out of the above mentioned position closing the aperture in the valve seat element 68. The valve element 70 is urged to move toward the particular position thereof by suitable biasing means which is shown comprising a preloaded helical compression spring 72 positioned within the air chamber 60 and seated at one end on the diaphragm 62 and at the other end on an end wall portion of the valve casing 56.

During idling of the engine, an increased vacuum is established in the intake manifold 16 or in the air-intake and air-meter assembly 10 downstream of the thottle valve 14 which is held in the idling or minimum-open angular position thereof. The vacuum acts on the diaphragm 62 of the exhaust gas recirculation control valve 54 through the exhaust gas feed passageway 50 and the valve and exhaust gas chambers 64 and 58 of the valve 54 and causes the diaphragm 62 to move or deform in a direction to move the valve element 66 into the axial position closing the aperture in the valve seat element 68. The valve element 68 being thus seated on the valve seat element 68 located between the exhaust gas recirculation passageway 48 and the valve chamber 64, the recirculation passageway 48 is isolated from the exhaust gas feed passageway 50 so that the recirculation of exhaust gases to the mixture supply system of the engine is interrupted. The construction and arrangement of the exhaust gas recirculation rate control valve 54 hereinbefore described is simple for the purpose of illustration and may therefore be modified and/or changed as desired.

The internal combustion engine illustrated in FIG. 1 further comprises an intake air bypass system comprising an intake air bypass passageway 74 which bypasses the throttle valve 14 in the air-intake and air-meter assembly 10 and a two-way air-flow control valve 76 provided in the bypass passageway 74. The air-flow control valve 76 is shown comprising a valve casing 78 formed with a generally cylindrical valve chamber in which a rotary valve spool 80 is rotatably positioned. The rotary valve spool 80 is formed with a diametral bore or passageway 82 which is open at both ends thereof and which is brought into and out of alignment with the bypass passageway 74 as the valve spool 80 turns about its center axis in the valve chamber in the casing 78. The construction and arrangement of the air-flow control valve 76 above described is also simple for the purpose of illustration and may thus be modified and/or changed as desired.

In accordance with the present invention, the internal combustion engine including the exhaust gas recirculation and intake air bypass systems thus constructed and arranged is provided with a control system adapted to control both of the exhaust gas recirculation control valve 54 and the air-flow control valve 76. In the embodiment illustrated in FIG. 1, such a control system largely consists of mechanical linkage means intervening between the valves 54 and 76, drive means for driving the linkage means in response to electric signals supplied to the drive means, and computerized control means adapted to produce the signals in response to various operational parameters of the vehicle.

The above mentioned mechanical linkage means comprises a rack and pinion assembly consisting of a toothed movable rack 84 and a pinion 86 which is in mesh with the rack 84. The movable rack 84 is elongated and longitudinally movable in a direction substantially aligned with the direction of movement of the valve element 66 forming part of the exhaust gas recirculation valve 54. The rack 84 has carried at one end thereof a generally cylindrical, hollow retaining member 88 axially projecting and open toward the previously mentioned breather port in the casing 56 of the recirculation rate control valve 54. The retaining member 88 has an annular end portion 90 radially turned inwardly and defining a circular opening at the leading end of the retaining member 88. A generally disc-shaped sliding member 92 is axially slidable within the retaining member 88 and is engageable with the inner face of the above mentioned annular end portion 90 of the retaining member 88. The sliding member 92 is carried by an elongated connecting cord 94 which is connected at one end thereof to the sliding member 88 and at the other end thereof to the diaphragm 62 of the recirculation rate control valve 54 through the breather port in the casing 56 of the valve 54 as shown. Thus, the sliding member 92 is axially movable together with the diaphragm 62 and accordingly the valve element 66 not only with respect to the stationary casing 56 but relative to the movable rack 84 when the sliding member 92 is disengaged from the annular end portion 90 of the retaining member 88. When the detaining and sliding members 88 and 92 assume relative positions in which the retaining member 92 is held in engagement with the annular end portion 90 of the detaining member 88 as shown, the sliding member 92 is forced to move together with the movable rack 84 if the rack 84 is moved away from the recirculation rate control valve 54.

If, thus, the directions of movement of the valve element 66 to provide communication and block the communication between the exhaust gas recirculation and feed passageways 48 and 50 are assumed to be first and second directions, respectively, the sliding member 92 are axially movable relative to the retaining member 88 in first and second directions which correspond to the first and second directions, respectively, in which the valve element 66 is movable. The retaining member 84 is also axially movable in first and second directions respectively corresponding to the first and second directions of movement of the valve element 66 and accordingly the sliding member 92. When the sliding and retaining members 92 and 88 are axially moved relative to each other in the first and second directions, respectively, of movement thereof, the retaining member 88 is brought into retaining engagement with the sliding member 92 for prohibiting the sliding member 92 from being moved in the first direction of movement thereof relative to the retaining member 88. If the retaining member 88 thus held in retaining engagement with the sliding member 92 is axially moved in the second direction of movement, the sliding member 92 is constrained to axially move also in the second direction of movement thereof irrespective of differential pressure acting on the diaphragm 62 of the recirculation rate control valve 54.

The mechanical linkage means intervening between the valves 54 and 76 further comprises a valve actuating arm 96 operatively connected at one end to the rotary valve spool 80 of the air flow control valve 76 in such a manner as to be capable of moving the valve spool 80 to turn about the axis of rotation thereof through the angular position having the bore or passageway 82 aligned with the intake air bypass passageway 74. The valve actuating arm 96 is connected to the above described movable rack 98 by means of a suitable connecting element 98 and is urged by suitable biasing means to move in a direction opposite to the direction in which the acutating arm 96 is to be moved when the rack 84 is moved in the first direction of movement thereof. The biasing means is herein shown comprising a preloaded helical tension spring 100 which is anchored at one end thereof to the actuating arm 96 and at the other end thereof to a suitable stationary member which may form part of the engine construction.

The pinion 86 in mesh with the movable rack 84 is rotatable about an axis fixed with respect to the engine construction and is driven for rotation about the axis by the preciously mentioned drive means forming part of the control system embodying the present invention. In the arrangement shown in FIG. 1, the drive means is shown comprising a reversible pulse motor 102 and a reduction gear unit 104 including an input gear rotatable with the output shaft of the motor 102 and an output gear rotatable with the pinion 86.

The pulse motor 102 and the previously described fuel injection valves 18 are electrically connected to an electric control circuit which is, in the embodiment herein shown, constituted by a microcomputer 106. The microcomputer 106 is responsive to various operational parameters of the engine for producing pulse signals as input signals for the fuel injection valves 18 and the pulse motor 102. Thus, the microcomputer 106 has input terminals connected to suitable sources of signals indicative of predetermined variable parameters of the engine. In the embodiment shown in FIG. 1, these signal sources are assumed to include an engine speed sensor 108 for detecting the revolution speed of the engine crankshaft 32 and producing an output signal Sn representative of the detected crankshaft revolution speed, an engine temperature sensor 110 for detecting the operating temperature of the engine and producing an output signal St representative of the detected engine temperature, a throttle valve position sensor 112 for detecting the opening degree of the throttle valve 14 in the air-intake and air-meter assembly 10 and producing an output signal Sv representative of the detected opening degree of the throttle valve 14, and an exhaust gas sensor 114 for detecting the concentration of a prescribed chemical component, such as oxygen, in the exhaust gases discharged from the power cylinders and producing an output signal Se representative of the detected concentration of the particular chemical component of the exhaust gases.

The engine speed sensor 108 may be constituted, by way of example, by an electromagnetic pickup counter comprising a magnetic rotor 116 rotatable with the crankshaft 32 of the engine and having south and north poles arranged alternately along the circumference of the rotor 116, and a coil unit 118 fixedly positioned in conjunction with the magnetic rotor 116 as shown. The engine speed sensor 108 thus arranged is adapted to produce as the output signal Sn thereof a train of pulses at a frequency proportional to the revolution speed of the crankshaft 32. On the other hand, the engine temperature sensor 110 is shown projecting into the cooling water jacket in the cylinder block 26 of the power cylinder 24 of the engine and is thus adapted to produce the output signal St thereof through detection of the temperature of the engine cooling water to be circulated through the water jacket. Furthermore, the throttle valve position sensor 112 is shown as comprising an electric potentiometer including a resistor 122 extending in an arc about an axis parallel with the shaft supporting the throttle valve 14, and a sliding contact 124 rotatable about the above mentioned axis and mechanically connected to the shaft of the throttle valve 14 by a suitable linkage. The throttle valve position sensor 112 thus arranged is operative to produce the output signal Sv thereof in the form of a voltage which is continuously variable with the opening degree of the throttle valve 14 in the air-intake and air-meter assembly 10. The microcomputer 106 is connected to a suitable power source (not shown) across an ignition switch 126 or any other detecting means responsive to starts and stops of the engine.

If desired, the signal sources for the microcomputer 106 may further include an air intake rate sensor 128 for detecting the induction rate of air through the air-intake and air-meter assembly 10 and producing an output signal Sa representative of the detected air induction rate. The air intake rate sensor 128 may be constituted by an air flow meter 130 provided in the air-intake and air-meter assembly 10 upstream of the throttle valve 14 and rotatable about a fixed axis depending upon the flow rate of air therethrough, and a potentiometer consisting of a resistor 132 extending in an arc about an axis parallel with the axis of rotation of the air flow meter 130 and a sliding contact 134 slidable on the resistor 132 and ganged to the air flow meter 130. The air intake rate sensor 128 is, thus, operative to produce as the output signal Sa thereof a voltage continuously variable with the flow rate of air through the air flow meter 130.

The signal sources may further comprise an exhaust gas temperature sensor 136 and an exhaust gas pressure sensor 138 provided in the exhaust gas recirculation passageway 48 downstream of the orifice 52 for detecting the temperature and pressure of the exhaust gases to be recirculated through the passageway 48 and producing output signals Sg and Sp, respectively, representative of the detected exhaust gas temperature and pressure. If, furthermore, it is desired to use a direct-current motor is used in lieu of the pulse motor 102 as the drive means for the rack 84 and the pinion 86, a valve position sensor 140 may be provided to detect the flow rate of exhaust gases through the exhaust gas recirculation rate control valve 54 from the axial position of the valve element 66 with respect to the valve seat element 68. In the arrangement illustrated in FIG. 1, such a valve position sensor 140 is shown constituted by a potentiometer comprising a resistor 142 extending in parallel with the connecting rod 94 between the diaphragm 62 of the recirculation rate control valve 54 and the sliding member 92 in the retaining member 88 connected to the movable rack 84. the potentiometer further comprises a sliding contact 144 movable with the connecting rod 94 and slidable on the resistor 142. The valve position sensor 140 is, thus, operative to produce an output signal Sf in the form of a voltage which is continuously variable with the axial position of the valve element 66 with respect to the valve seat element 68 and accordingly with the flow rate of exhaust gases to be passed through the valve 54.

The various sensors thus arranged are electrically connected to a central processing unit 146 (CPU) of the microcomputer 106 further including a memory unit 148 and an input/output unit 150.

The operation of the control system thus arranged in accordance with the present invention will be hereinafter described briefly.

When the internal combustion engine is idling, the idling condition is detected by, for example, the engine speed sensor 108 which is producing an output signal Sn representative of an engine speed lower than a predetermined value. In response to the signal Sn thus delivered from the engine speed sensor 108, the microcomputer 106 controls the pulse motor 102 in such a manner as to drive the pinion 86 to turn in a direction to move the rack 84 in the previously mentioned first direction of movement thereof. This causes the valve actuating arm 96 to move against the force of the tension spring 100 in a direction to turn the rotary valve spool 80 of the air flow control valve 76 in a counterclockwise direction in FIG. 1 so that the diametral bore of passageway 82 in the valve spool 80 is brought into alignment with the intake air bypass passageway 74. The intake air bypass passageway 74 being thus allowed to be open to the air-intake and air-meter assembly 10 downstream of the throttle valve 14 which is now held in the idling or minimum-open position thereof, air is inducted into the power cylinders of the engine through the intake air bypass passageway 74 and the air flow control valve 76 as well as the idling air passageway 20 for thereby rendering the combustion conditions of the engine stable.

As the rack 84 is moved in the first direction of movement thereof, the retaining member 88 secured to the rack 84 slides on the peripheral surface of the sliding member 92 so that the movement of the rack 84 in the first direction of movement thereof exercises no effect on the sliding member 92 and accordingly on the valve element 66 of the recirculation rate control valve 54. The valve element 66 of the recirculation rate control valve 54 is therefore maintained in the position fully closing the sperture in the valve seat element 68 by force resulting the suction development in the intake manifold 16 of the engine and thus acting through the exhaust gas feed passageway 50 on the diaphragm 62 of the recirculation rate control valve 54. The recirculation of exhaust gases to the mixture supply system of the engine is thus interrupted under idling conditions of the engine at relatively low speeds.

If the engine speed rises beyond a certain value during idling of the engine, the microcomputer 106 responsive to, for example, the output signal Sn from the engine speed sensor 108, controls the pulse motor 102 to drive the pinion 86 to turn in a direction to move the rack 84 in the second direction of movement thereof, viz., upwardly in FIG. 1. This, in turn, causes the valve actuating arm 96 to move in a direction to turn the rotary valve spool 80 of the air flow control valve 76 in a clockwise direction in FIG. 1 so that the diametral bore or passageway 82 in the valve spool 80 is deviated from the direction fully aligned with the intake air bypass passageway 74 of is completely brought out of alignment with the passageway 74. This results in reduction or interruption of the flow of air through the air flow control valve 76 and accordingly in reduction of the output speed of the engine. Under these conditions, the fuel injection valves 18 are controlled to inject fuel into the intake manifold 16 or directly into the intake ports of the power cylinders of the engine in such a manner as to produce combustible mixtures with such air-fuel ratios which are optimum for the operating conditions of the engine such as, for example, the flow rates of air inducted into the power cylinders as detected by the air intake rate sensor 128.

The central processing unit 146 of the microcomputer 106 is programmed so that the pulse signals supplied from the microcomputer 106 to the pulse motor 102 have duty factors which are effective to cause the rack 84 to move only such distance that will not cause retaining engagement of the retaining member 88 with the sliding member 92. Under conditions in which the flow of air through the air flow control valve 76 is reduced or interrupted during idling of the engine as above described, the valve element 66 of the recirculation rate control valve 54 is therefore maintained in the position closing the aperture in the valve seat element 68 and interrupts the recirculation of exhaust gases through the valve 54.

When the throttle valve 14 in the air-intake and air-meter assembly 10 is driven to turn into a part-throttle or full-throttle position thereof and the output speed of the engine increases accordingly, the pulse motor 102 is operated to drive the rack 84 to further move in the second direction of movement thereof and brings the retaining member 88 into retaining engagement with the sliding member 92. The movement of the rack 84 in the second direction of movement thereof therefore causes the sliding member 92 and accordingly the valve element 66 of the recirculation rate control valve 54 to move away from the valve seat element 68 against the force resulting from the suction acting on the diaphragm 62. The aperture in the valve seat element 68 being thus allowed to be open, the exhaust gases recirculated from the exhaust pipe 42 to the exhaust gas recirculation passageway 48 are directed past the valve 54 and through the exhaust gas feed passageway 50 into the intake manifold of the engine and are admixed to the air to be inducted into the power cylinders 24 of the engine. The pulses to be supplied to the pulse motor 102 under these conditions are varied by the microcomputer 106 in accordance with, for example, the output signals Sn from the engine speed sensor 108 and the output signals Sa from the air intake rate sensor 128.

The further movement of the rack 84 in the second direction of movement thereof causes the valve actuating arm 96 to turn the valve spool 80 of the air flow control valve 76 past the angular position providing communication between the intake air bypass passageway 74 and the diametral bore or passageway 82 in the valve spool 80. The bypass passageway 74 is therefore fully closed by the air flow control valve 76 and interrupts the flow of air through the bypass passageway 74 into the intake manifold 16 of the engine.

Figure 2:
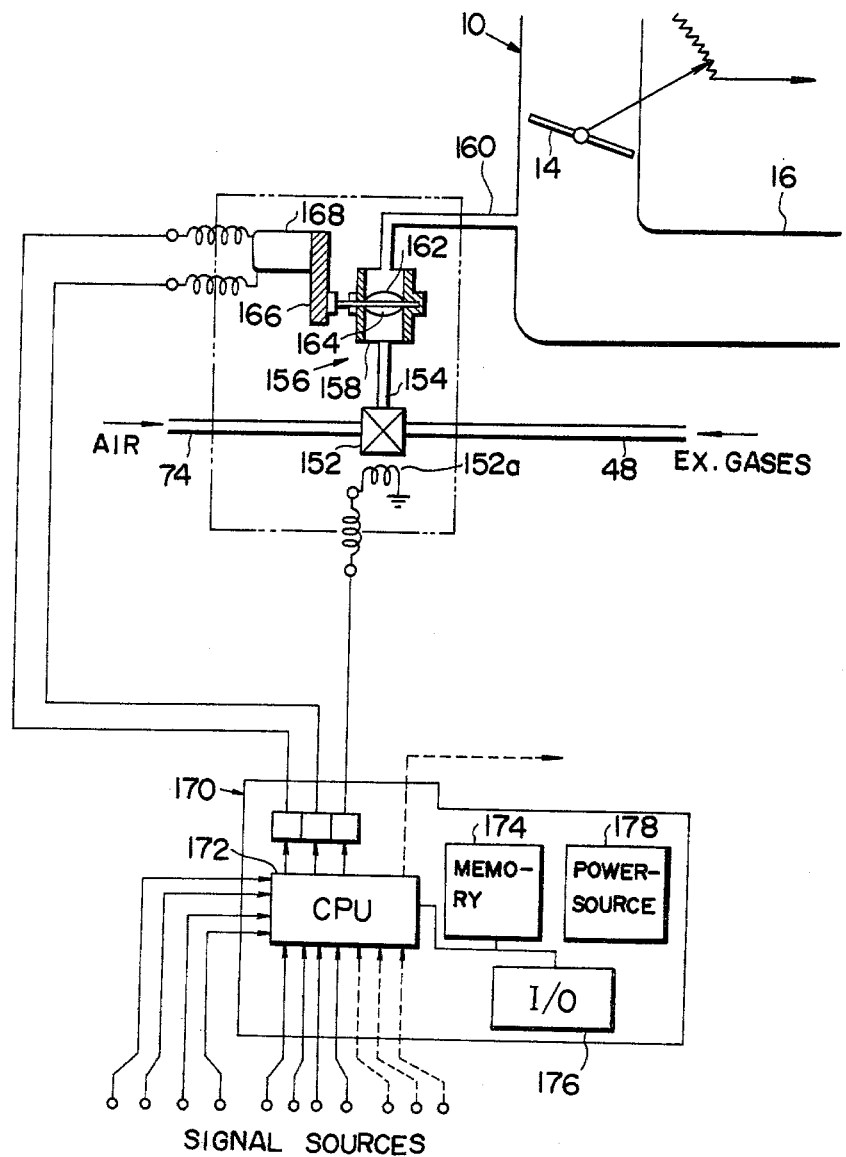
FIG. 2 is a view showing also partially in section and in part schematically another preferred embodiment of the control system according to the present invention.

FIG. 2 shows another embodiment of the control system according to the present invention. In FIG. 2, an internal combustion engine is shown including an air-intake and air-meter assembly 10 having a throttle valve 14 provided therein, an exhaust gas recirculation passageway 48 leading from the exhaust system (not shown) of the engine, and an intake air bypass passageway 74 leading from the air-intake and air-meter assembly 10 upstream of the throttle valve 14.

The exhaust recirculation passageway 48 and the intake air bypass passageway 74 terminate in a solenoid-operated three-way shift valve 152 having two inlet ports (not shown) respectively open to the passageways 48 and 74 and an outlet port which is open to an air/exhaust-gas passageway 154. Though not shown in the drawings, the three-way shift valve 152 has provided therein a rotary or reciprocating valve spool movable between a position providing communication from one of the two inlet ports to the outlet port and a position providing communication from the other inlet port to the outlet port of the valve 154. The valve spool is urged to assume one of these two positions thereof suitable biasing means (not shown) incorporated into the valve 152 and is forced to move into the other of the positions when a solenoid coil 152a associated with the valve spool is energized. For purposes of description, it is herein assumed that the valve spool of the shift valve 152 is urged to assume the position providing communication between the outlet port and the inlet port open to the exhaust gas recirculation passageway 48 and is forced to move into the position providing communication between the outlet port and the inlet port open to the intake air bypass passageway 74 when the solenoid coil 152a is energized.

The air/exhaust-gas passageway 154 leading from the shift valve 152 thus arranged terminates in a motor-driven flow control valve 156 having a valve casing 158 which intervenes between the air/exhaust-gas passageway 154 and a passageway 160 communicating with the intake manifold 16 of the engine or the air-intake and air-meter assembly 10 downstream of the throttle valve 14. The flow control valve 156 is constructed as throttle valve and thus comprises a generally circular valve plate 162 which is positioned within the valve casing 158 and which is rotatable between a minimum-open and maximum-open angular positions with a valve shaft 164 journaled at both ends to the valve casing 158. The shaft 164 thus supporting the valve plate 162 extends substantially transversely to the direction of flow of fluid through the valve casing 158 and is coupled through a suitable reduction gear unit 166 to the output shaft of a reversible motor 168. The opening degree of the valve plate 162 in the valve casing 158 is thus variable with the duty factor of the pulse signals supplied to the pulse motor 168. If desired, the pulse motor 168 may be substituted by a direct-current motor, if desired.

The pulse motor 168 and the solenoid-operated three-way shift valve 152 are electrically connected to an electric control circuit which is, in the arrangement herein shown, assumed to be constituted by a microcomputer 170 by way of example. Similarly to its counterpart in the embodiment of FIG. 1, the microcomputer 170 has input terminals connected to various sources of signals indicative of prescribed operational parameters of an automotive vehicle such as, for example, the opening degree of the throttle valve 14, the induction rate of air through the air-intake and air-meter assembly 10, the concentration of a prescribed chemical component such as oxygen in the exhaust gases discharged from the engine cylinders, the engine temperature such as the temperature of the cooling medium for the engine, the engine speed, the angular position of the engine crankshaft, the vehicle speed, the gear position selected in the power transmission system of the vehicle, and so forth. These signals are fed to a central processing unit 172 (CPU) of the microcomputer 170 which is adapted to supply pulse signals to the coil 152a of the solenoid-operated three-way shift valve 152 and the coil (not shown) of the pulse motor 166 depending upon the pieces of information represented by the signals fed the central processing unit 170. In FIG. 2, the microcomputer 170 is shown further comprising a memory unit 174, an input/output unit 176 and a power source unit 176. Designated by 178 in FIG. 2 is a throttle valve position sensor adapted to detect the opening degree of the throttle valve 14 in the air-intake and air-meter assembly 10 and producing in output signal representative of the detected opening degree of the throttle valve 14.

During idling of the engine, the microcomputer 170 controls the three-way shift valve 152 to remain energized and accordingly maintain the valve spool thereof in the position providing communication between its inlet port open to the intake air bypass passageway 74 and its outlet port open to the air/exhaust-gas passageway 154. Fresh air admitted through an air cleaner (not shown) to the intake air bypass passageway 74 is therefore passed through the shift valve 152 and the air/exhaust-gas passageway 154 and further past the flow control valve 156 to the intake manifold 16 of the engine at a rate which varies with the opening degree of the valve plate 162 of the flow control valve 156. Under idling conditions of the engine, the pulse motor 168 is operated by the microcomputer 172 in such a manner that the opening degree of the valve plate 162 of the flow control valve 156 decreases or increases when the engine speed represented by a signal supplied to the central processing unit 172 of the microcomputer 170 in higher or lower, respectively, than a predetermined value so that the output speed of the engine converges toward the predetermined value.

When the engine is operating under part-throttle or full-throttle conditions and requires recirculation of exhaust gases into the mixture supply system thereof, the microcomputer 170 cuts off the supply of current to the solenoid coil 152a of the three-way shift valve 152 and allows the valve 152 to provide communication between its inlet port open to the exhaust gas recirculation passageway 48 and its outlet port open to the air-/exhaust-gas passageway 154. As a consequence, the exhaust gases which are admitted into the exhaust gas recirculation passageway 48 from the exhaust system of the engine are passed through the shift valve 152 and the air/exhaust-gas passageway 154 and further past the flow control valve 156 to the intake manifold 16 of the engine at a rate which varies with the opening degree of the valve plate 162 of the flow control valve 156 operated by the pulse motor 168 under the control of the pulse signals from the microcomputer 170.

While the present invention has been assumed to be embodied in an automotive internal combustion engine of the fuel injection type, it will be apparent that the basic features of the control system herein proposed are applicable to not only such an engine but to an internal combustion engine of the type using a carburetor or carburetors.

What is claimed is:

1. In an internal combustion engine including an air-fuel mixture supply system having a throttle valve incorporated therein, an exhaust system, an exhaust gas recirculation passageway for recirculating exhaust gases from the exhaust system to the mixture supply system at controlled rates, and an intake air bypass passageway for allowing air to be admitted at controlled rates into the mixture supply system downstream of the throttle valve when the throttle valve is in a minimum-open angular position thereof, a control system comprising, in combination;

valve means operative to control the flow rate of the exhaust gases to be recirculated through said exhaust gas recirculation passageway and the flow rate of air to be passed through said intake air bypass passageway, an electric motor operatively connected to said valve means for actuating the valve means in response to electric signals supplied to the motor, and a control circuit responsive to variable parameters related to prescribed operational conditions of the engine for operating said motor on the basis of said parameters.

2. A control system as set forth in claim 1, in which said valve means comprises an exhaust gas recirculation rate control valve including a valve element which is responsive to suction in the mixture supply system downstream of said throttle valve and which is movable in opposite first and second directions respectively to interrupt and allow passage of exhaust gases through said exhaust gas recirculation passageway, and an air flow control valve including a valve element movable across a position allowing said intake air bypass passageway to be open into said mixture supply system downstream of said throttle valve, said electric motor being mechanically coupled to the respective valve elements of said recirculation rate control valve and said air flow control valve.

3. A control system as set forth in claim 2, further comprising linkage means operatively intervening between the respective valve elements of said exhaust gas recirculation valve and said air flow control valve, said electric motor being mechanically coupled to said linkage means for driving said valve elements to move independently of each other under some predetermined conditions of the engine and together with each other under other predetermined conditions of the engine.

4. A control system as set forth in claim 3, in which said linkage means comprises a movable member connected to the valve element of said air flow control valve and engageable with the valve element of said recirculation rate control valve, the movable member being movable in opposite first and second directions respectively corresponding to said first and second directions of movement of the valve element of said recirculation rate control valve and being brought into retaining engagement of the valve element of the recirculation rate control valve when the valve element of the recirculation rate control valve and said movable member are moved in their respective first and second directions of movement, said electric motor being in driving engagement with said movable member for driving the movable member to longitudinally move in directions and through distances dictated by the electric signals supplied to the motor form said control circuit.

5. A control system as set forth in claim 4, in which said linkage means further comprises a retaining member movable with said movable member, a sliding member movable with the valve element of said exhaust gas recirculation rate control valve and engaging said retaining member, said retaining member being brought into retaining engagement with the sliding member when valve element of the recirculation rate control valve and said movable member are moved in their respective first and second directions of movements, said movable member and the valve element of said recirculation rate control valve being movable with respect to each other when the movable member is out of retaining engagement with the valve element of the recirculation rate control valve.

6. A control system as set forth in claim 5, in which said movable member consists of a toothed rack and in which said linkage means further comprises a pinion which is in constant mesh with said rack, said electric motor being in driving connection to said pinion.

7. A control system as set forth in claim 1, in which said valve means comprises a three-way shift valve having two inlet ports respectively open to said exhaust gas recirculation passageway and said intake air bypass passageway and an outlet port communicable with either of said inlet ports depending upon a signal supplied from said control circuit, and a flow control valve having an inlet port communicating with the outlet port of the shift valve and an outlet port communicating with said mixture supply system downstream of said throttle valve, the flow control valve having a valve element positioned between the inlet and outlet ports of the flow control valve and operatively connected to the output shaft of said electric motor for being operated between minimum-open and maximum-open positions depending upon signals supplied from said control circuit.

8. A control system as set forth in any one of preceding claims, in which said electric motor is a pulse motor.

9. A control system as set forth in any one of claims 1 to 7, in which said electric motor is a direct-current motor.

10. A control system as set forth in any one of claims 2 to 7, in which said electric motor is a direct-current motor, the control system further comprising a valve position sensor responsive to the movement of the valve element of said exhaust gas recirculation rate control valve for producing an electric signal representative of the position of the valve element with respect to a predetermined reference position, the valve position sensor having an output terminal connected to said control circuit.

* * * * *